(12) United States Patent
Tveit

(10) Patent No.: US 10,585,920 B2
(45) Date of Patent: *Mar. 10, 2020

(54) TEMPORAL LAYERS FOR PRESENTING PERSONALIZATION MARKERS ON IMAGERY

(71) Applicant: Google LLC, Mountain View, CA (US)

(72) Inventor: Amund Tveit, Trondheim (NO)

(73) Assignee: Google LLC, Mountain View, CA (US)

( * ) Notice: Subject to any disclaimer, the term of this patent is extended or adjusted under 35 U.S.C. 154(b) by 1172 days.

This patent is subject to a terminal disclaimer.

(21) Appl. No.: 14/048,746

(22) Filed: Oct. 8, 2013

(65) Prior Publication Data

US 2015/0161165 A1    Jun. 11, 2015

Related U.S. Application Data

(63) Continuation of application No. 11/726,085, filed on Mar. 20, 2007, now Pat. No. 8,584,013.

(51) Int. Cl.
*G06F 3/048* (2013.01)
*G06F 16/29* (2019.01)
(Continued)

(52) U.S. Cl.
CPC .............. *G06F 16/29* (2019.01); *G06F 16/00* (2019.01); *G06Q 10/00* (2013.01)

(58) Field of Classification Search
CPC ...................................................... G06F 17/30
(Continued)

(56) References Cited

U.S. PATENT DOCUMENTS 5,379,215 A    1/1995 Kruhoeffer et al.
5,948,040 A    9/1999 DeLorme et al.
(Continued)

FOREIGN PATENT DOCUMENTS

JP    2000010472 A    1/2000
JP    2004021432 A    1/2004

OTHER PUBLICATIONS

Liberty City Map, (online) http://grandtheftauto.ign.com/maps/1/Liberity-City-Map, May 1, 2008, 3 pages.
(Continued)

*Primary Examiner* — Mohamed Abou El Seoud
(74) *Attorney, Agent, or Firm* — Fish & Richardson P.C.

(57) ABSTRACT

A temporal layer containing personalization markers (e.g., placemarks) created by a user at a given time (or time period), can be combined with map imagery, allowing the user (or other users) to show only the personalization markers contained in the temporal layer. Temporal layers can be of arbitrary temporal or geographical size, fully or partially overlapping in time or space, split into smaller temporal layers, logically aligned or combined and/or continuous or non-continuous in time or space. Temporal layers can be stored in a repository where they can be searched and used by others. Temporal layers can be associated with search services (e.g., news search) or search histories (e.g., automatic temporal layers based on search history). A user's personal profile can be compared with other users' personal profiles and the results of the comparison can be used to recommend temporal layers. Advertisements can be associated with temporal layers.

17 Claims, 10 Drawing Sheets

(51) Int. Cl.
*G06F 16/00* (2019.01)
*G06Q 10/00* (2012.01)

(58) Field of Classification Search
USPC .................................................. 715/700
See application file for complete search history.

(56) References Cited

U.S. PATENT DOCUMENTS

| | | | |
|---|---|---|---|
| 6,356,283 B1 | 3/2002 | Guedalia | |
| 6,427,118 B1 | 7/2002 | Suzuki | |
| 6,504,571 B1 | 1/2003 | Narayanaswami et al. | |
| 6,542,812 B1 | 4/2003 | Obradovich et al. | |
| 6,647,409 B1 | 11/2003 | Sherman et al. | |
| 6,813,395 B1 | 11/2004 | Kinjo | |
| 6,853,904 B2 | 2/2005 | Matsuo et al. | |
| 7,007,228 B1 | 2/2006 | Carro | |
| 7,225,207 B1 | 5/2007 | Ohazama et al. | |
| 7,231,393 B1 | 6/2007 | Harik et al. | |
| 7,346,856 B2 | 3/2008 | Nguyen et al. | |
| 7,353,114 B1 | 4/2008 | Rohlf et al. | |
| 7,428,524 B2 | 9/2008 | Burrows et al. | |
| 7,580,789 B2 | 8/2009 | Nomura | |
| 7,593,740 B2 | 9/2009 | Crowley et al. | |
| 7,627,666 B1 | 12/2009 | DeGiulio et al. | |
| 7,643,673 B2 | 1/2010 | Rohlf et al. | |
| 7,693,324 B2 | 4/2010 | Brasen et al. | |
| 7,783,644 B1 | 8/2010 | Petrou et al. | |
| 7,865,308 B2 | 1/2011 | Athsani et al. | |
| 7,869,938 B1 | 1/2011 | Wako | |
| 7,878,392 B2 | 2/2011 | Mayers et al. | |
| 7,933,395 B1 | 4/2011 | Bailly et al. | |
| 8,095,434 B1 | 1/2012 | Puttick et al. | |
| 8,397,177 B2 | 3/2013 | Barros | |
| 8,521,663 B1* | 8/2013 | Phillips | G06Q 40/00 706/12 |
| 2002/0029226 A1 | 3/2002 | Li et al. | |
| 2002/0055924 A1 | 5/2002 | Liming | |
| 2002/0103597 A1 | 8/2002 | Takayama et al. | |
| 2003/0105658 A1* | 6/2003 | Chen | G06Q 30/02 705/7.29 |
| 2003/0158651 A1 | 8/2003 | Matsuo et al. | |
| 2003/0200192 A1 | 10/2003 | Bell et al. | |
| 2004/0019584 A1 | 1/2004 | Greening et al. | |
| 2004/0068697 A1 | 4/2004 | Hark et al. | |
| 2004/0070678 A1 | 4/2004 | Toyama et al. | |
| 2005/0053309 A1 | 3/2005 | Szczuka et al. | |
| 2005/0278386 A1 | 12/2005 | Kelly et al. | |
| 2006/0036583 A1 | 2/2006 | Sondergaard et al. | |
| 2006/0085396 A1 | 4/2006 | Evans et al. | |
| 2006/0106944 A1 | 5/2006 | Shahine et al. | |
| 2006/0136481 A1 | 6/2006 | Dehn et al. | |
| 2006/0217883 A1 | 9/2006 | Nomura | |
| 2006/0224583 A1 | 10/2006 | Fikes et al. | |
| 2006/0224615 A1 | 10/2006 | Korn et al. | |
| 2006/0238379 A1 | 10/2006 | Kimchi et al. | |
| 2006/0271281 A1 | 11/2006 | Ahn et al. | |
| 2007/0061365 A1 | 3/2007 | Giegerich et al. | |
| 2007/0073562 A1 | 3/2007 | Brice et al. | |
| 2007/0087798 A1 | 4/2007 | McGucken | |
| 2007/0100862 A1 | 5/2007 | Reddy et al. | |
| 2007/0136259 A1 | 6/2007 | Dorfman et al. | |
| 2007/0143345 A1 | 6/2007 | Jones et al. | |
| 2007/0168331 A1 | 7/2007 | Reddy et al. | |
| 2007/0179952 A1 | 8/2007 | Vespe et al. | |
| 2007/0185895 A1 | 8/2007 | Hogue et al. | |
| 2007/0203867 A1 | 8/2007 | Hogue et al. | |
| 2007/0282792 A1 | 12/2007 | Bailly et al. | |
| 2007/0297683 A1 | 12/2007 | Luo et al. | |
| 2008/0074423 A1 | 3/2008 | Gan et al. | |
| 2008/0077597 A1 | 3/2008 | Butler | |
| 2008/0091757 A1 | 4/2008 | Ingrassia et al. | |
| 2008/0147366 A1 | 6/2008 | Schutz et al. | |
| 2008/0189249 A1 | 8/2008 | Petakov et al. | |
| 2008/0250026 A1* | 10/2008 | Linden | G06F 17/30867 |
| 2009/0055355 A1 | 2/2009 | Brunner et al. | |
| 2009/0089252 A1 | 4/2009 | Galitsky et al. | |
| 2009/0125550 A1 | 5/2009 | Barga et al. | |
| 2009/0254842 A1 | 10/2009 | Leacock et al. | |
| 2009/0313272 A1 | 12/2009 | Irish et al. | |
| 2010/0042923 A1 | 2/2010 | Barcay et al. | |
| 2010/0054527 A1 | 3/2010 | Kirmse et al. | |
| 2011/0007094 A1 | 1/2011 | Nash et al. | |
| 2011/0066588 A1 | 3/2011 | Xie et al. | |
| 2011/0145039 A1 | 6/2011 | McCarney et al. | |
| 2011/0153368 A1 | 6/2011 | Pierre et al. | |
| 2011/0279476 A1 | 11/2011 | Nielsen et al. | |
| 2011/0283217 A1 | 11/2011 | Nielsen et al. | |
| 2011/0285749 A1 | 11/2011 | Nielsen et al. | |
| 2011/0320114 A1 | 12/2011 | Buxton et al. | |

OTHER PUBLICATIONS

Barroso, Luiz Andre et al., "Web Search for a Planet: The Google Cluster Architecture," IEEE Micro, IEEE Computer Society, Mar.-Apr. 2003, pp. 22-28.

Dean, Jeffrey et al., "MapReduce: Simplified Data Processing on Large Clusters," Symposium on Operating System Design (OSDI), Dec. 6-8, 2004, 13 pages.

Foley, James D. et al., Ch. 15, "Visible-Surface Determination," "Computer Graphics: Principals and Practice Second Edition in C," Addison-Wesley (2006), pp. 649-720.

Ghemawat, Sanjay et al., "The Google File System," Association for Computing Machinery (ACM), 19th Symposium on Operating System Principles (SOSP), Oct. 19-22, 2003, Lake George, New York, 15 pages.

Keyhole 2 Fusion Version 2.3, Copyright © 2005 Keyhole, Inc., 195 pages.

Google Earth Blog, Google Earth Blog Copyright @ 2005-2012 Frank Taylor, Aug. 31, 2005, 24 pages.

* cited by examiner

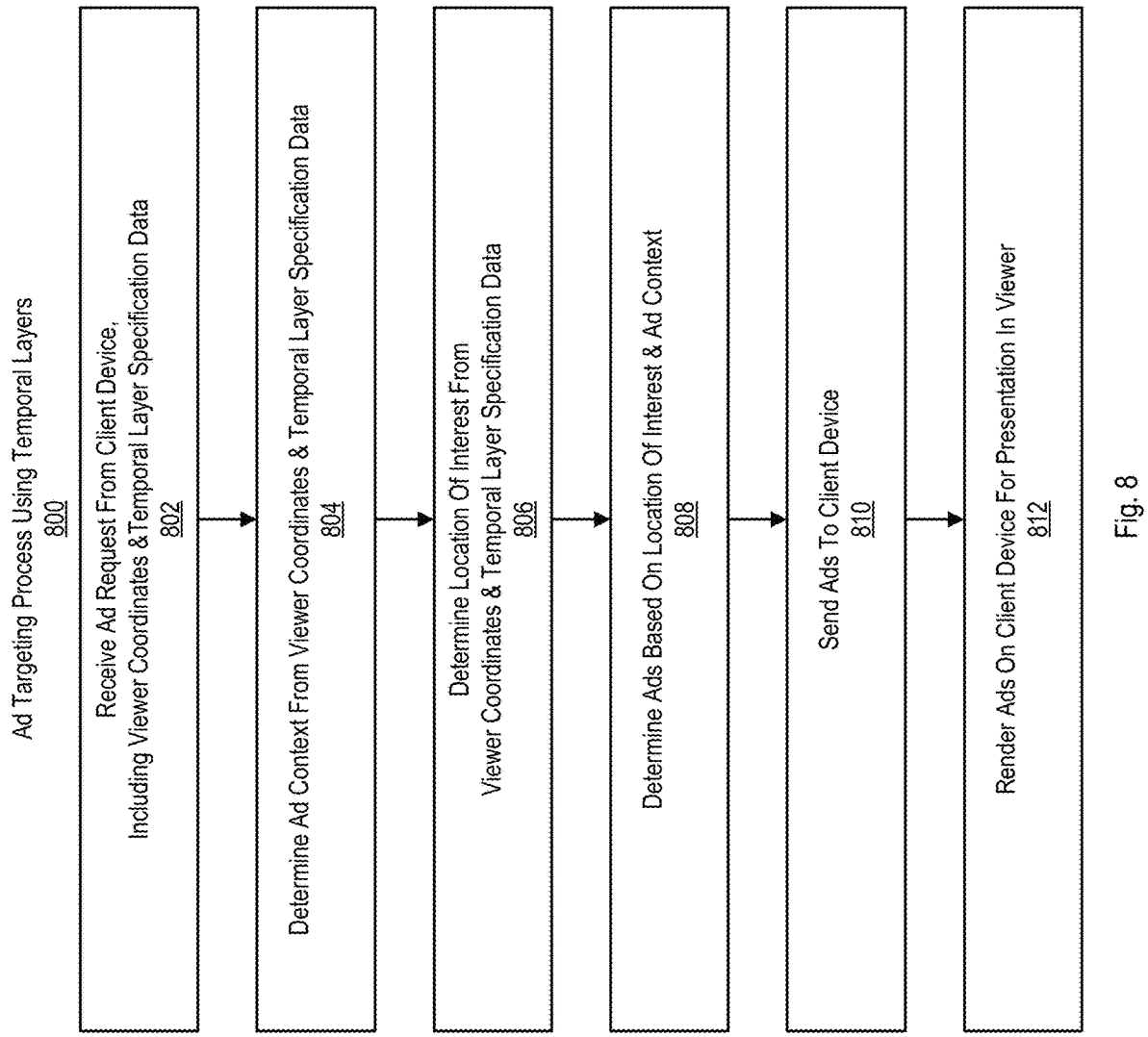

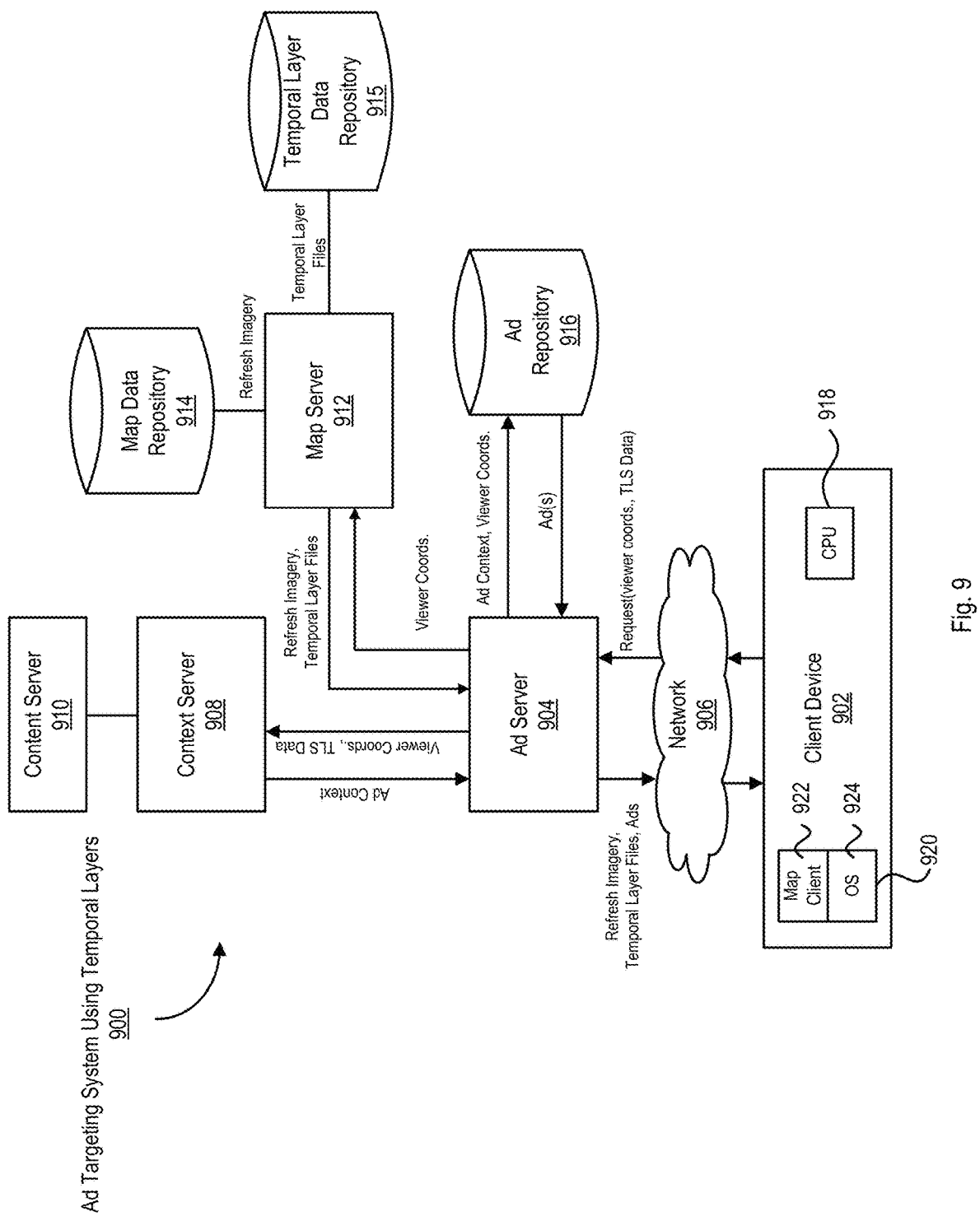

TEMPORAL LAYERS FOR PRESENTING PERSONALIZATION MARKERS ON IMAGERY

CROSS-REFERENCE TO RELATED APPLICATION

This application is a continuation of, and claims priority under 35 U.S.C. § 120 to, U.S. patent application Ser. No. 11/726,085, filed on Mar. 20, 2007. The disclosure of which is incorporated herein by reference in its entirety.

TECHNICAL FIELD

The subject matter of this application is generally related to online map services.

BACKGROUND

Personalization markers can be used with online map services (e.g., Google Earth™) to highlight geographic locations in imagery provided by the online map services. Users can add a variety of personalization markers to map imagery, including placemarks (i.e., for highlighting a geographic location), image overlays, paths, polygons (i.e., for selecting a geographic area) and network links (e.g., hyperlinks). These personalization markers can be shared in online communities and other forums, where users can, for example, manually download image overlays containing personalization markers of other users and incorporate the overlay into the current imagery.

If a user uses a particular map service for several years, and in several different settings incrementally adds personalization markers, the user's view of the imagery can become "messy" and difficult to use. Additionally, users with similar personalization markers, such as partially geographically overlapping or semantically overlapping (e.g., jazz festivals in Ireland and jazz festivals in Norway) markers, are likely to have a common interest. When online communities grow to tens of millions of users it will become increasingly harder for users to manually find interesting sets of personalization markers in the absence of automated search tools.

SUMMARY

The deficiencies described above are overcome by the disclosed implementations of a temporal layer containing personalization markers (e.g., placemarks) that can be created by a user for a given time (or time span) and combined with imagery (e.g., map imagery), allowing the user (or other users) to view only the personalization markers contained in the temporal layer. Temporal layers can be of arbitrary temporal or geographical size, fully or partially overlapping in time or space, split into smaller temporal layers, logically aligned or combined and/or continuous or non-continuous in time or space.

In some implementations, temporal layers can be stored in a repository where they can be searched and used by others. Temporal layers can be associated with other search services (e.g., news search) or search histories (e.g., automatic temporal layers based on search history). A user's personal profile can be compared with other users' personal profiles, and the results of the comparison can be used to recommend temporal layers. Advertisements can be associated with temporal layers.

In some implementations, first content (e.g., a first set of digital images) containing time and position information for a given geographic location can be used to identify second content associated with the same geographic location (e.g., a second set of digital images), so that the second content can be associated with a personalization marker of a temporal layer.

In some implementations, a method includes: receiving input specifying a temporal layer containing a personalization marker associated with imagery; and responsive to the input, providing the temporal layer for display on a device.

In some implementations, a method includes: generating a personalization marker for presentation on imagery; generating a timestamp for the personalization marker; and associating the personalization marker with a temporal layer using the timestamp.

In some implementations, a method includes: receiving a first set of digital images taken at a geographic location, the first set of digital images including information identifying the geographic location; comparing the first set of digital images with a second set of digital images; determining a subset of digital images from the second set of digital images that matches the first set of digital images; and associating the subset of digital images with a personalization marker in a virtual world application at the geographic location.

In some implementations, a method includes: specifying a search query; responsive to the search query, receiving imagery and a temporal layer, the temporal layer including information associated with a personalization marker included in the temporal layer; and presenting the imagery and temporal layer including the personalization marker on a display.

Other implementations of temporal layer for presenting personalization markers on imagery are disclosed, including implementations directed to systems, methods, apparatuses, computer-readable mediums and user interfaces.

DESCRIPTION OF DRAWINGS

FIG. 8 is a flow diagram of an example of an ad targeting process using temporal layers.

FIG. 9 is a block diagram of an implementation of an ad targeting system for associating advertisements with temporal layers.

DETAILED DESCRIPTION

Although the text that follows describes a computer-implemented, virtual world program, it should be understood that the disclosed implementations can be applied to any application or service that uses maps or imagery, including search engines (e.g., Google Image Search™) or search services (e.g., news search, image archives), video services, bookmark services, games, etc.

Personalization Markers

Figure 1:
FIG. 1 is an image of San Francisco generated by the Google Earth™ online map service.

FIG. 1 is an image of San Francisco generated by the Google Earth™ online virtual world program developed by Google, Inc. (Mt. View, Calif.). Google Earth™ maps the Earth by superimposing images obtained from satellite imagery, aerial photography and a Geographic Information System (GIS) over a three-dimensional (3D) virtual globe. At an "eye" altitude of 15.97 miles, the image shown in FIG. 1 is fairly easy to view even though the image includes a number of default markers for providing information and highlighting points of interest.

Some virtual world applications (e.g., Google Earth™) allow users to add "personalization markers" to imagery to designate points of interest and/or to provide information or content. "Personalization markers" can include but are not limited to: placemarks, image overlays, paths, a polygon (e.g., for selecting a geographic area) and network links (e.g., hyperlinks), etc. For example, Google Earth™ provides "placemarks," which are markers (e.g., represented by "pushpin" icons) overlaid onto imagery at user-selected locations. Placemarks can be clicked or otherwise interacted with by the user to display information and/or content (e.g., digital photos) related to the location. A suitable virtual navigation tool can be used to position a placemark in the image. A dialog box or other user interface element can be used to set properties of the placemark, including, for example, a name, description, color, scale, opacity, view, altitude, etc. Placemarks created by users can be shared with other users in an online Web community, such as "The Google Earth Community."

The examples used throughout this specification will refer to placemarks rather than personalization markers. The disclosed implementations, however, apply to all types of personalization markers as that term is defined herein.

Figure 2:
FIG. 2 is an image of San Francisco, including a single personalization marker.
Figure 3:
FIG. 3 is an image of San Francisco, including a set of twenty personalization markers.

FIG. 2 is a satellite image of San Francisco, including a single placemark 202 represented by a "pushpin" icon. As can be observed, the image is uncluttered and generally easy to read. However, if a user incrementally adds placemarks to the image over time, the image can become cluttered. For example, in FIG. 3 an image of San Francisco includes a set of twenty placemarks 302 created over a time span of several days. The placemarks 302 are labeled 1-20 for convenience. Many of the icons representing placemarks are overlapping which makes the image appear cluttered. Moreover, the close proximity of the icons makes it difficult for a user to select a particular placemark using a mouse or other pointing device.

To clean up the image, the user could manually remove placemarks one by one. For example, Google Earth™ allows the user to remove a placemark from the image by unchecking a box associated with the placemark located in a side panel of the Google Earth™ user interface. Although this method may work for a small number of placemarks, it can become tedious and time consuming if the user wants to remove several hundred placemarks.

Specifying Personalization Markers with Timestamps

Figure 4:
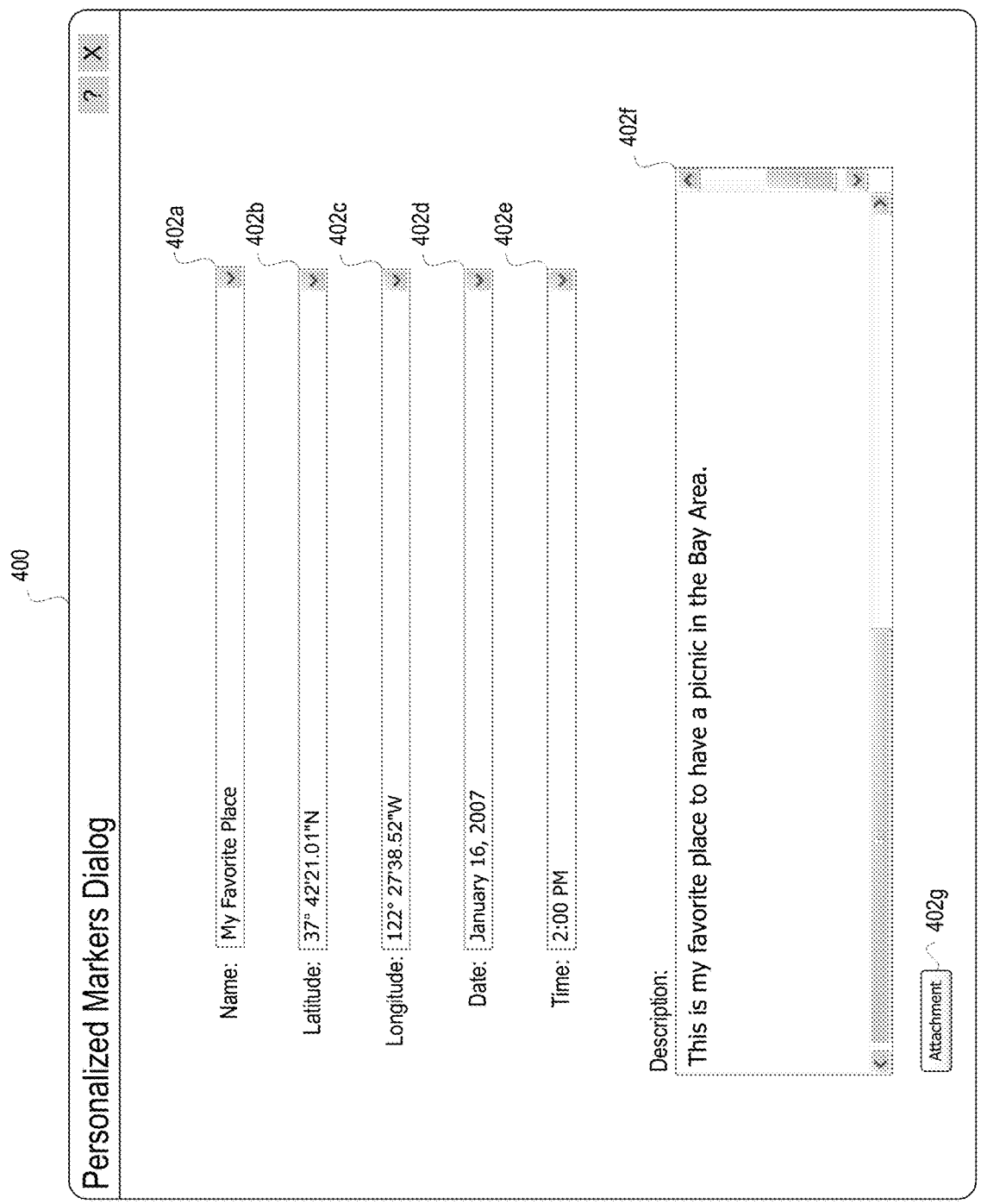
FIG. 4 illustrates an implementation of a dialog for specifying personalization markers including timestamps.

FIG. 4 is an example of a dialog 400 for specifying personalization markers with timestamps. In some implementations, the dialog 400 includes text boxes 402 for specifying various parameters for a placemark.

In the example shown, a first text box 402a is used for specifying a name for a placemark. The text entered into box 402a can be displayed in the image proximate to a representative icon for the placemark. Text boxes 402b and 402c are used to specify the coordinates (e.g., latitude and longitude) of the placemark, respectively. In some implementations, these parameters can also be specified graphically using, for example, a suitable virtual navigation tool. Text boxes 402d and 402e are used to specify a timestamp (e.g., date and time) associated with the creation of the placemark. In some implementations, the text boxes 402d and 402e can include the current date and time as default values.

In some implementations, a personalized marker can be associated with a time span (e.g., a historic battle lasting for a few days), which can be later added into a temporal layer. The time span could be delineated by a stop and start timestamp. To associate personalized markers with time spans, the dialog 400 can be extended, for example, to include one or more text boxes and/or other user interface elements for entering start and stop timestamps for the time span. If a temporal layer corresponding to the time span or timestamp is not available, a new temporal layer can be created for the time span or timestamp, and the personalization marker can be added to the new temporal layer.

Text box 402f is used to provide a description that will be displayed when a user selects the personalization marker by clicking or otherwise interacting with the icon representing the personalization marker.

The dialog 400 described above is one example of a dialog that can be used to specify a timestamp for a placemark. Other methods or mechanisms for specifying timestamps for personalization markers in general can include, but are not limited to: tool bars, menus, graphical tools, etc. Any numbers or types of parameters for personalization markers can be specified by a user depending on the application. For example, the dialog 400 can include a button 402g, which when clicked by a user, provides a second or extended dialog for allowing the user to attach or associate information or content (e.g., digital photos, digital video, a .pdf) to a personalization marker. In some implementations, timestamps and other parameters can be specified programmatically without user intervention, or can be provided by an external resource (e.g., GPS receiver, network server).

Temporal Layer Specification

Once the personalization markers have been associated with timestamps (e.g., using dialog 400), they can be aggregated into temporal layers, which can be overlaid on an image. A "temporal layer" as used herein is an image overlay or software layer that includes a set of personalization markers that have timestamps that fall within a time span. Temporal layers can be of arbitrary temporal or geographical size, fully or partially overlapping in time or space, split into smaller temporal layers, logically aligned or combined and/or continuous or non-continuous in time or space. Temporal layers can be stored in a repository where they can be searched and used by others. Temporal layers can be associated with search services (e.g., news search) or search histories (e.g., automated temporal layers based on search history). A user's personal profile can be compared with other users' personal profiles (e.g., other users having similar interests to the user) and the results of the comparison can be used to recommend temporal layers to the user. Advertisements can be associated with temporal layers for ad targeting purposes.

In some implementations, temporal layers can be specified using Extensible Markup Language (XML) grammar. In Google Earth™, for example, Keyhole Markup Language (KML) is used to specify placemarks and dynamically fetch and update KML files from a KML server. KML is an XML grammar and file format for modeling and storing geographic features such as points, lines, images and polygons for display in the Google Earth™ 3D viewer. In some implementations, a placemark can be specified using a KML file. The Google Earth™ client can render the KML file and display the placemark over the current image. For example, an exemplary KML file for creating a placemark over an image can include the following KML statements:

```
<?xml version= "1.0" encoding= "UTF-8"?>
kml xmlns="http://earth.google.com/kml/2.0">
  <Placemark>
    <description>Tethered to the ground by a customizable tail
    </description>
    <name>My Favorite Place</name>
    <LookAt>
      <longitude>-122.2739</longitude>
      <latitude>37.4221</latitude>
      <range>540.68</range>
      <tilt>0</tilt>
      <heading>3</heading>
    </LookAt>
  <visibility>0</visibility>
  <Style>
      <IconStyle>
        <Icon>
          <href>root://iocns/palette-3.png</href>
          <x>96</x>
          <y>160</y>
          <w>32</w>
          <h>32</h>
        </Icon>
      </IconStyle>
  </Style>
    <Point>
      <extrude>1</extrude>
      <altitudeMode>relativeToGround</altitudeMode>
      <coordinates>-122.2739,37.4221,0</coordinates>
    </Point>
  <Timestamp>
      <when>2007-01-07T2:00:00+00:00</when>
  </Timestamp>
  </Placemark>
</kml>
```

The KML file described above includes (reading the file from top to bottom) an XML header, a KML namespace declaration, the placemark's description, the placemark's name, a camera view for the placemark, a default visibility for the placemark (in this case, it has to be switched on by the user), a style for the placemark, detailing where the image is located, a switch for whether or not the placemark is to be extruded (yes), the type of altitude mode the placemark should use, the position of the placemark on the Earth's surface and the timestamp for the placemark.

In some implementations, the KML file can be created by a client device and sent to a KML server, which can store the KML file in a repository. In the KML file shown, the <TimeStamp> element has the syntax dateTime(YYYY-MM-DDThh:mm:sszzzzzz). This syntax includes a date field, a local time field and a field for a plus or minus conversion to Universal Time Coordinated (UTC). The <TimeStamp> element allows for the creation of temporal layers as described in reference to FIGS. 6 and 7. Further detail on using KML to perform custom applications can be found in the "KML 2.1 reference" document, which is incorporated by reference herein in its entirety. The "KML 2.1 reference" document is publicly available from Google, Inc., and includes samples of KML that can be used to implement temporal layers.

Figure 5A:
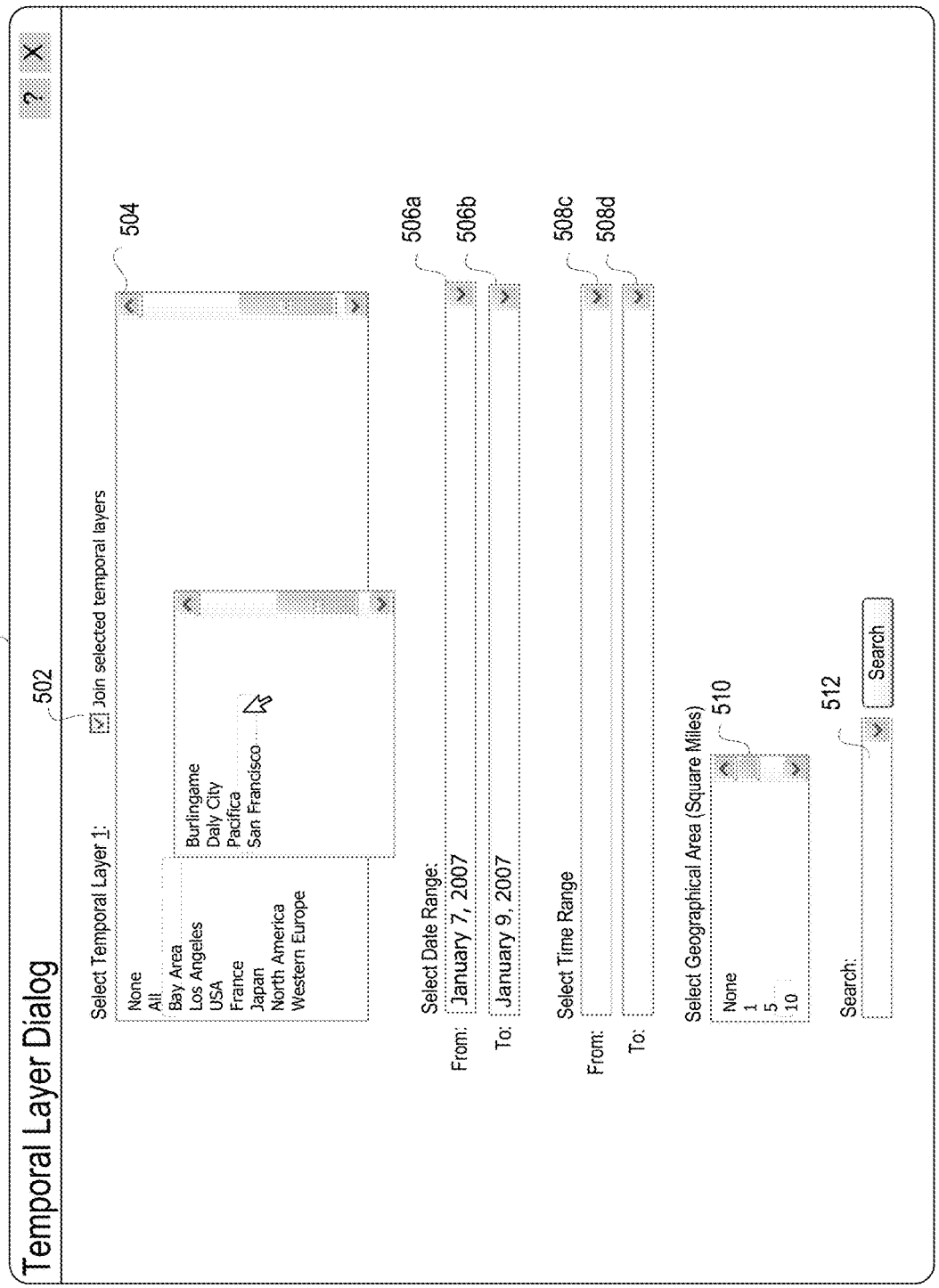
FIG. 5A is an example of a user interface for specifying a temporal layer.

FIG. 5A is an example of a dialog 500 for specifying a temporal layer. In some implementations, the dialog 500 includes a checkbox 502, text boxes 504, 506, 508, 510 and a search box 512. In the example shown, it is assumed that placemarks spanning the world have been created and uploaded to a virtual world application, such as Google Earth™.

Using the text box 504, the user can select one or more temporal layers from a list of available temporal layers. In some implementations, the temporal layers can be organized into hierarchical folders based on hemispheres, regions, continents, states, cities, towns or any other suitable delineation. A user can select a desired temporal layer by highlighting the description in the list. In the example shown, the user has selected San Francisco.

In some implementations, a user can logically align and join multiple temporal layers by highlighting the desired temporal layers in the list (e.g., holding the shift key down while selecting) and checking the check box 502. For example, the Roman Empire can be built from several temporal layers that cover different geographical areas (e.g., from individual empires time period) or landscape that changes over time.

In some implementations, multiple temporal layers can be selected that are non-continuous in time and space by highlighting the desired temporal layers in the list and leaving the check box 502 unchecked. For example, a temporal layer that includes a "Winter Olympics" time period will show personalization markers for different places on the Earth but with different timestamps (e.g., a few week periods every 4 years.).

In some implementations, the text boxes 506a and 506b allow the user to specify a date range for one or more temporal layers. In the example shown, the user has specified a date range of Jan. 7, 2007 through Jan. 9, 2007 for the temporal layer covering San Francisco. In some implementations, the user can specify different date ranges for different temporal layers.

In some implementations, the text boxes 508a and 508b allow the user to specify a time range for one or more temporal layers. In the example shown, the user has not specified a particular time range. This can result in personalization markers having timestamps within the specified date range to be included in the temporal layer.

In some implementations, the text box 510 allows the user to specify a geographical area (e.g., in square miles) for one or more temporal layers. In the example shown, the user has selected a geographic area of 10 square miles for the temporal layer covering San Francisco between the dates Jan. 7-9, 2007.

Spatial/Temporal Boundaries of Shared Temporal Layers

As previously discussed, users can specify temporal layers and share the temporal layers with other users in, for example, an online community. Users of the online community may have different opinions about how to specify a spatial or temporal boundary of a temporal layer. For example, in a "social" temporal layer a user may create a placemark that includes text of the user's opinion about a historical event associated with a particular time span and geographic location (e.g., the time span of the Viking period or the geographical span of the Roman Empire). In some implementations, differing opinions among users about the time span and geographic location of a historical event can be resolved by computing, for example, a median or average temporal and/or spatial boundary for the temporal layer. The median or average temporal and/or spatial boundary can be computed from statistical distribution information derived from various opinions presented in the online community or elsewhere (e.g., from academia). Temporal layers having statistical temporal and/or spatial boundaries can be displayed with embellishments (e.g., thicker lines, colored lines) to differentiate from temporal layers having deterministic boundaries.

In some implementations, some users can have more authority than other users in an online community. This authority can be earned by, for example, adding many previous temporal layers to the online community that are close to the median or average temporal layer and/or by being favored by other users or peers (e.g., the user is a famous scholar). When a temporal layer is selected for display, the personalization marker of an authority user can be highlighted (or otherwise modified) to visually distinguish the authority user's personalization marker from other personalization markers.

Figure 5C:
FIGS. 5B and 5C are images of San Francisco with and without a temporal layer applied.
Figure 5B:

FIGS. 5B and 5C are satellite images of San Francisco with and without a temporal layer covering San Francisco between the dates Jan. 7-9, 2007. As can be observed in FIG. 5B, the larger number of "pushpin" icons representing placemarks have cluttered the image, making the selection of a particular placemark difficult. As shown in FIG. 5C, when the temporal layer is applied to the image, only placemarks for the dates Jan. 7-9, 2007 are shown, resulting in an image with improved readability and usability. Thus, the temporal layer acts a time-based filter for filtering out personalization markers that do not meet the specified filter criteria.

Searching for Temporal Layers

Users with similar personalization markers (e.g., partially overlapping or semantically overlapping) are likely to have some common interests. With online communities that have millions of users it becomes increasingly difficult for users to manually find interesting sets of personalization markers. To solve this problem, in some implementations, the search box 512 in dialog 500 allows a user to search for temporal layers using search queries. In the example shown, the user can enter a search query in the text box 512 and click the search button to start a search. In some implementations, a search engine receives the query, parses out query terms, then uses the query terms with an index (e.g., an inverted index) to access a repository of personalization markers. For example, the user could enter the search query "winter olympics" to find temporal layers including personalization markers having timestamps that are contained in the time span of the Winter Olympics. In some implementations, a user can indirectly search for temporal layers by searching for something that is frequently associated with a time period (or region). When searching for temporal layers related to, for example, Elvis Presley, several time periods during his career and life may be presented in the search results. For example, the search query "Elvis in the military" may return one or more temporal layers with a date range of the 1960s that includes one or more placemarks for a geographic region spanning Germany. Such indirect search-based selection can be implemented, for example, using clustering technology or other information extraction technologies, as described in reference to FIG. 9.

The dialog 500 is one example of the many ways a user can specify parameters for creating a temporal layer. Other methods are possible. For example, rather than a dialog (or in addition to a dialog), the user can be allowed to specify parameters using an embedded navigation control or other user interface element. A set of wheels or sliders with variable granularity jumps can be used to search through a repository of temporal layers. In some implementations, the embedded navigation control shown in FIG. 5B can be augmented with additional controls (e.g., additional wheels, sliders or buttons) or operate in two modes: one mode for navigating temporal layers and another mode for navigating imagery. In some implementations, temporal layers are specified automatically or programmatically without user intervention by, for example, an application, utility or operating system.

Temporal Layer File Generation Process

Figure 6:
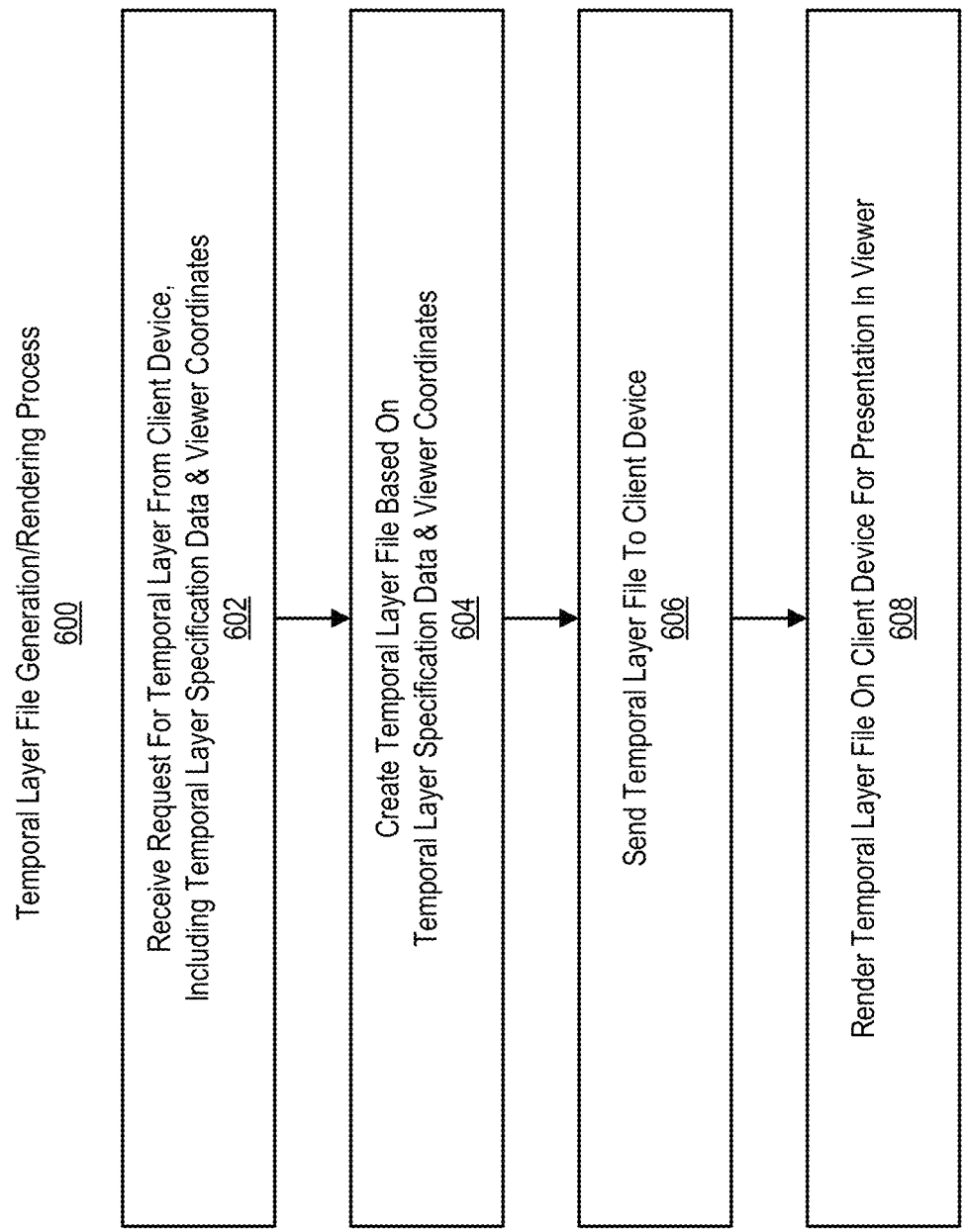
FIG. 6 is a flow diagram of an example of a temporal layer file generation process.

FIG. 6 is a flow diagram of an example of a temporal layer file generation/rendering process 600. In some implementations, a virtual world application running on a client device allows a user to navigate a virtual world (e.g., Google Earth™, Microsoft® Virtual Earth™). The process 600, however, is not limited to virtual world applications but can be used with any application that uses maps or imagery. The client device can be any device capable of displaying maps or imagery, including but not limited to: computers, mobile phones, media player/recorders, television set-top boxes, game consoles, navigation systems, personal digital assistants (PDA), email devices, electronic tablets, consumer electronic devices).

In some implementations, the client device communicates with a server over a network connection (e.g., the Internet, Ethernet, a wireless network). The server receives a request for a temporal layer from the client device (602). The request can include temporal layer specification data and viewer coordinates. The viewer coordinates determine the geographic location on Earth that the user is currently viewing or would like to navigate or "fly" to. Temporal layer specification data can include any information that can be used to create a temporal layer, including a date range, a time range, a geographic area, coordinates for personalization markers, etc. The server uses the viewer coordinates and/or the temporal layer specification data to generate one or more temporal layer files (604). In some implementations, the generation of a temporal layer file includes retrieving time stamped personalization markers from a repository, as described in reference to FIG. 7. The temporal layer file is sent to the client device (606). The client device renders the temporal layer file for presentation in a viewer (608).

In some implementations, the temporal layer file is a KML file that is generated by a KML server and sent to a client device to be rendered and presented to a user in a viewer (e.g. the Google Earth™ 3D viewer). In other implementations, the temporal layer file is a KML file that is generated by the client device using temporal layer specification data (e.g., placemark coordinates) received from the server. A script language (e.g., Python™ scripting language) can be called from the KML file and used to render the placemarks of the temporal layer. In some implementations, the KML file includes a network link that loads the script. The script can include one or more loops for extracting latitude and longitude values from, for example, an array of latitude and longitude values for placemarks contained in the temporal layer. The latitude and longitude values can be inserted in a <coordinates> element of a <Point> for generating KML that can be rendered and presented in the 3D viewer. In some implementations, whenever, a request for a temporal layer is received from a client device, or in response to a trigger event (e.g., a network link refresh), the script can generate new KML using the latitude and longitude values. Some example scripts for implementing the procedures described above can be found in the "KML 2.1 reference" document previously referenced herein.

Client/Server Architecture for Temporal Layers

Figure 7:
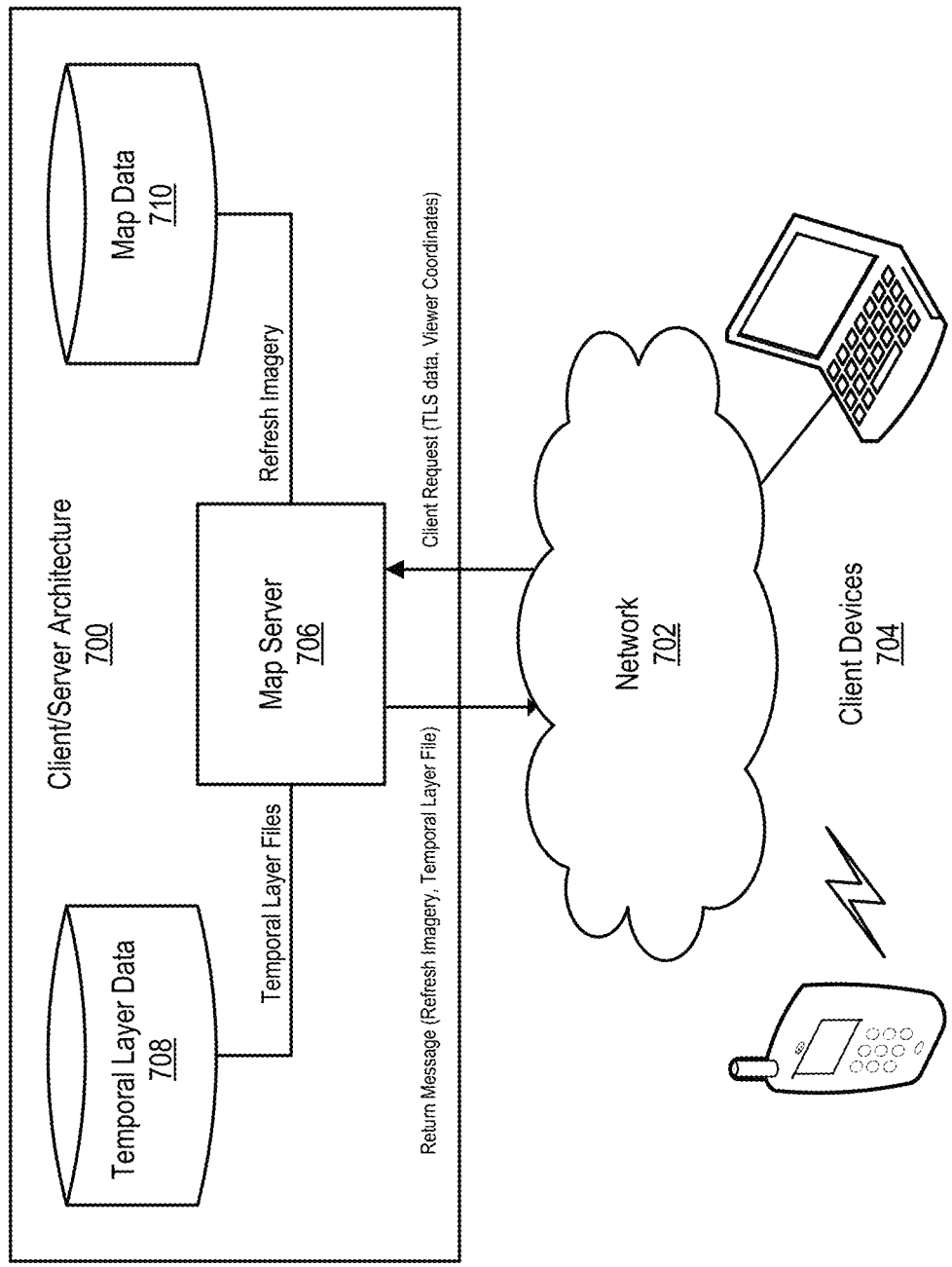
FIG. 7 is a block diagram of an exemplary client/server architecture for delivering temporal layer files to client devices.

FIG. 7 is a block diagram of an implementation of a client/server architecture 700 configured for delivering map imagery and one or more temporal layer files to client devices 704 through a network 702 (e.g., the Internet, Ethernet, wireless network). In some implementations, the client/sever architecture 700 includes a map server 706, a temporal layer data repository 708 and a map data repository 710.

In some implementations, client devices 704 send requests for refresh imagery and/or temporal layer files to the map server 706. The requests can include temporal layer specification data for specifying how a temporal layer will be generated by the map server 706. Examples of temporal layer specification data include date and time range data, geographical area, current view coordinates, content and any other data that can be used to create a temporal layer.

In some implementations, the temporal layer specification data is used by an index server (not shown) to retrieve placemarks stored in a repository 708 (e.g., a MySQL® database). For example, placemarks covering San Francisco that fall within the date range of Jan. 7-9, 2007, can be retrieved by the index server and sent to the map server 706. In some implementations, the map server 706 creates one or more temporal layer files (e.g., KML files) containing instructions and/or scripts that can be interpreted by a viewer running on the client device and used to render the temporal layer over imagery. In some implementations, the map server 706 can also provide the client device with refresh imagery retrieved from the map data repository 710.

Ad Targeting Process Using Temporal Layers

FIG. 8 is a flow diagram of an example of an ad targeting process 800 using temporal layers. In some implementations, a client device allows a user to navigate a virtual world application (e.g., Google Earth™, Microsoft® Virtual Earth™). The process 800, however, is not limited to virtual world applications but can be used with any application that uses maps or imagery.

In the example shown, the process 800 begins when an ad request is received from a client device (802). The request can include viewer coordinates and temporal layer specification data. Ad context can be determined from the viewer coordinates, temporal layer specification data and/or content associated with a personalization marker (804). Such data can be provided in, for example, a KML file. For example, if the user is viewing an image of San Francisco with a temporal layer containing placemarks spanning Jan. 7-9, 2007, then the viewer coordinates for those placemarks (e.g., described in a KML placemark file) and/or the specified date range can be used to define a context for which ads can be targeted. Additionally, the name of the placemark and any content associated with the placemark (e.g., text, digital imagers, video) can be used to determine context. For example, placemark names and/or descriptions can be analyzed for keywords or themes using a clustering technology. An example of clustering technology is described in U.S. Provisional Patent Application No. 60/416,144, for "Methods and Apparatus for Probabilistic Hierarchical Inferential Learner," filed Oct. 3, 2002, which application is incorporated by reference herein in its entirety.

In some implementations, a location of interest to a user can be determined from viewer coordinates for a placemark, temporal layer specification data and/or content (806). The targeted ads could be related to, for example, businesses operating in the geographic location represented by a placemark or other personalization marker, as determined by the viewer coordinates. Temporal layer specification data can include a geographic area of interest (See FIG. 5A), which could be used to determine a boundary around a location of interest. The name of the placemark or associated content can also provide clues on location. For example, Global Positioning System (GPS) information included with digital images could be used to determine a location of interest to a user.

In some implementations, temporal layer specification data can be used to target ads to a specified time period. For example, an antique dealer can advertise antiques for a specified time period, or a music or video download service can advertise audio or video content for a specified time period.

In some implementations, the process 800 determines one or more ads for presenting on a client device based on the ad context and/or location of interest (808). For example, an online ad targeting system (e.g., Google AdSense™) can match ad inventory to ad context and/or location of interest. The ads are sent to the client device (810) where the ads are rendered for presentation in a viewer (812).

Ad Targeting System Architecture Using Temporal Layers

FIG. 9 is a block diagram of an example of an ad targeting system for including advertisements to temporal layers. In some implementations, the system 900 includes an ad server 904, a context server 908, a map server 912, an ad repository 916, a map repository 914 and a temporal layer data repository 915.

In some implementations, the system 900 is operationally coupled to one or more devices 902 through a network 906 (e.g., the Internet, Ethernet, wireless network). In some implementations, a client device 902 includes a computer-readable medium 920 for storing a map client 922 (e.g., Google Earth™ client) and an operating system 924. The client device 902 also includes one or more processors 918, which can be configured to execute instructions for performing various operations for the map client 922 and/or operating system 924.

In some implementations, ad requests (including viewer coordinates and temporal layer specification (TLS) data) are sent by the client device 902 to the ad server 904 through the network 906. The viewer coordinates and TLS data are sent to the context server 908, which uses, for example, clustering technology to determine a context for ad targeting. For example, if the viewing coordinates define a point in San Francisco, the ads can be targeted to San Francisco. If the TLS data includes content (text description, digital images), then the content can also be analyzed to determine an ad context. A description of the ad context is sent back to the ad server 904, which forwards the ad context description, together with the viewer coordinates, to the ad repository 916. In some implementations, a database manager (not shown) uses the ad context description and viewer coordinates to select one or more ads from an ad inventory that are related to the ad context and location specified by the viewer coordinates. Ads from the repository 916 are sent to the ad server 904, which sends the ads to the client device 902 through the network 906.

Collaborative Filtering/Recommendation Engine

In some implementations, temporal layer files can be made available to other users over a network. For example, users can create temporal layer files and share them with other users. A repository of temporal layer files can be coupled to a search engine that allows users to enter queries, such as the search feature described in reference to FIG. 5A. In some implementations, a collaborative filter or recommendation engine can use the query terms to filter out temporal layer files that may be of interest to a user. The user can then be presented with a list of recommendations for temporal layers.

In some implementations, user profiles can be compared to provide recommendations based on, for example, dissimilarities from similar users. In some implementations, user profiles can be represented as vectors in n-space, where each vector component can be a user characteristic. The vectors can be then compared to each other using known mathematically techniques (e.g., Euclidean distance measure) to determine similarity between user profiles.

In some implementations, a recommendation engine can include a data structure for comparing personalization markers, temporal layers or users. For comparing users, a user vector can have vector components that include, for example: i) personalization markers created (together with their time and position), ii) temporal layers created (with positions/areas and time spans) and iii) temporal layers and personalization markers viewed/visited. To facilitate the comparison of user vectors, the vector components can be created in chunks of time and space, i.e., whole month chunks can be used as a resolution for the last few years and hundred year chunks can be used as a resolution for more dated temporal layers.

For example, if a user specifies a temporal layer for Jan. 11, 1984, the layer might be a part of a 1984 chunk in the user's vector. For spatial information, a resolution could be, for example, a country, or an arbitrary-sized rectangle (e.g., selected from a grid-divided Earth). For example, Stockholm Sweden could be contained in a Sweden chunk, London in a United Kingdom chunk, etc. If a first user has a user vector with, for example, the one-year chunks Sweden, UK and Brazil in 1984, and a second user has a user vector with, for example, the one-year chunks Sweden, Brazil, Ireland in 1983, the first user could be recommended to look into an "Ireland 1983" temporal layer, and the second user could be recommended to look into a "UK 1984" temporal layer. In some implementations, semantic information can be added as a component in a user vector to help determine recommendations. Semantic information can be provided by, for example, WordNet™ (maintained by Princeton University) or a similar tool. For example, the word "music" has a semantic relationship with the words "jazz" and "rock", since jazz and rock are both music genres.

Improved Placement of Web Pages in Virtual World

When users take digital pictures with positioning information (e.g., GPS) attached to the pictures, and upload the pictures to a virtual world application (e.g., Google Earth™), the set of pictures and positioning information can be used to indirectly determine geographic locations (or at least improve estimates of geographic locations) for placing other types of content (e.g., Web pages) in the virtual world. In some implementations, timestamps included with the positioning information can be used to create temporal layers containing the personalization markers for which the content can be associated. For example, a user could take digital pictures in Central Park, New York City on the dates Jan. 7-9, 2007. The user could then upload the pictures to a virtual world application where the pictures can be manually or automatically associated or linked with one or more temporal layers or individual personalization markers (e.g., placemarks). The "KML 2.1 reference" document provides sample KML code that can be used in Google Earth™ to form associations or links between content and placemarks. The user can also specify a temporal layer, so that only pictures taken at the location of the placemark on, for example, January 7 are displayed in the viewer.

The foregoing concept can be further explained by the following example. Assume, that a first user takes a first set of digital pictures M ($M_1 \ldots M_N$) in Central Park, New York City on Jan. 7, 2007. Further assume that the first set of pictures M were taken with a mobile phone camera that adds GPS information to the pictures (e.g., added to a JPEG header). These pictures can be compared with a second set of digital pictures P appearing on a Web page W accessible on the World Wide Web through a browser. The second set of pictures P could be taken by second user on, for example, Jan. 8, 2007. The second set of pictures P could have been captured by a Web crawler and stored in an index (e.g., inverted index) where they can be searched by a search engine (e.g., Google™ Search). The search engine could compare the first set of pictures M with the second set of pictures P to determine a match. The comparison could be made using known image processing techniques. If the pictures in P match (or approximately match) the pictures in M, then it can be assumed that the pictures P were taken at the same location as the pictures M. Since the pictures P occur on Web page W, an estimate of the location of where to put the Web page W in the virtual world can be determined.

In some implementations, the estimate can be used to better target search queries in a virtual world. For example, a user can submit a query "big moments at Scandinavian rock festivals" and receive results that include Web pages that cover all of Scandinavia. If, however, a first user takes a set of pictures of, e.g., the main stage of a music festival in Scandinavia, those pictures can be compared with pictures taken by a second user, and the results of the comparison can be used to estimate a specific location in Scandinavia for placing the Web pages resulting from the query (i.e., the main stage of the musical festival).

Thus, content can be associated with personalization markers and automatically included in temporal layers for display in viewers. For example, a user can specify a temporal layer for placemarks in Central Park between the dates of Jan. 7-9, 2007, and the set of pictures M and the Web page W will be attached or otherwise associated (e.g., provide a link to the Web page W) with placemark(s) contained in the specified temporal layer.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications may be made to the disclosed implementations and still be within the scope of the following claims.

What is claimed is:

1. A method comprising:

receiving, by a data processing apparatus, a search query that was submitted by a first user, the search query including one or more terms indicating a topic of the search query;

analyzing, by the data processing apparatus, the one or more terms of the search query to identify the topic of the search query;

identifying, by the data processing apparatus, a user profile for the first user that submitted the search query;

comparing, by the data processing apparatus, the user profile for the first user that submitted the search query to user profiles for other users to identify at least one other user that meets a similarity criterion with respect to the first user;

identifying, by the data processing apparatus, a plurality of candidate temporal layers that have been associated with the at least one other user that meets the similarity criterion with respect to the first user, each of the candidate temporal layers identifying a respective set of map personalization markers that represent a corresponding group of events that are at least one of temporally or geographically related to each other;

selecting, by the data processing apparatus, a first of the candidate temporal layers from the plurality of candidate temporal layers based on the topic of the search query;

providing data representing the first of the candidate temporal layers to a computing device for display, wherein the computing device is configured to display the first of the candidate temporal layers by overlaying graphical representations of the respective set of map personalization markers for the first of the candidate temporal layers on images that are displayed by the computing device and that show at least a portion of a geographic area associated with the topic of the search query.

2. The method of claim 1, further comprising:

combining two or more temporal layers to generate the first of the candidate temporal layers.

3. The method of claim 2, wherein the two or more temporal layers are non-continuous in time or space.

4. The method of claim 2, wherein the two or more layers are overlapping in time or space.

5. The method of claim 1, further comprising determining a time span for the topic of the search query and a geographic area for the topic of the search query, wherein at least one of the time span for the topic of the search query or the geographic area for the topic of the search query are determined statistically from multiple estimates of the time span for the topic of the search query or multiple estimates of the geographic area for the topic of the search query, respectively.

6. The method of claim 1, further comprising:

associating an advertisement with the first of the candidate temporal layers; and providing the advertisement to the computing device for display along with the data representing the first of the candidate temporal layers.

7. The method of claim 1, wherein the computing device is configured to display the first of the candidate temporal layers by overlaying graphical representations of the respective set of map personalization markers on the images at locations in the images that correspond to geographic locations for the corresponding group of events represented by the respective set of map personalization markers for the first of the candidate temporal layers.

8. The method of claim 1, wherein the images that are displayed by the computing device show a map of the at least the portion of the geographic area associated with the topic of the search query.

9. A system comprising:

one or more data processors;

a computer-readable storage medium coupled to the one or more data processors and including instructions, which, when executed by the one or more data processors, causes the one or more data processors to perform operations comprising:

receiving a search query that was submitted by a first user, the search query including one or more terms indicating a topic of the search query;

analyzing the one or more terms of the search query to identify the topic of the search query;

identifying a user profile for the first user that submitted the search query;

comparing the user profile for the first user that submitted the search query to user profiles for other users to identify at least one other user that meets a similarity criterion with respect to the first user;

identifying, a plurality of candidate temporal layers that have been associated with the at least one other user that meets the similarity criterion with respect to the first user, each of the candidate temporal layers identifying a respective set of map personalization markers that represent a corresponding group of events that are at least one of temporally or geographically related to each other;

selecting a first of the candidate temporal layers from the plurality of candidate temporal layers based on the topic of the search query;

providing data representing the first of the candidate temporal layers to a computing device for display, wherein the computing device is configured to display the first of the candidate temporal layers by overlaying graphical representations of the respective set of map personalization markers for the first of the candidate temporal layers on images that are displayed by the computing device and that show at least a portion of a geographic area associated with the topic of the search query.

10. A non-transitory computer-readable storage medium having instructions stored thereon, which, when executed by a processor, causes the processor to perform operations comprising:

receiving a search query that was submitted by a first user, the search query including one or more terms indicating a topic of the search query;

analyzing the one or more terms of the search query to identify the topic of the search query;

identifying a user profile for the first user that submitted the search query;

comparing the user profile for the first user that submitted the search query to user profiles for other users to identify at least one other user that meets a similarity criterion with respect to the first user;

identifying, a plurality of candidate temporal layers that have been associated with the at least one other user that meets the similarity criterion with respect to the first user, each of the candidate temporal layers identifying a respective set of map personalization markers that represent a corresponding group of events that are at least one of temporally or geographically related to each other;

selecting a first of the candidate temporal layers from the plurality of candidate temporal layers based on the topic of the search query;

providing data representing the first of the candidate temporal layers to a computing device for display, wherein the computing device is configured to display the first of the candidate temporal layers by overlaying graphical representations of the respective set of map personalization markers for the first of the candidate temporal layers on images that are displayed by the computing device and that show at least a portion of a geographic area associated with the topic of the search query.

11. The method of claim 1, further comprising, after providing the data representing the first of the candidate temporal layers to the computing device for display:

receiving, by the data processing apparatus, an indication that a user input at the computing device selected to display a second of the candidate temporal layers; and providing data representing the second of the candidate temporal layers to the computing device for display, wherein the computing device is configured to change from displaying the first of the candidate temporal layers to displaying the second of the candidate temporal layers by replacing the graphical representations of the respective set of map personalization markers for the first of the candidate temporal layers with graphical representations of the respective set of map personalization markers for the second of the candidate temporal layers over images that are displayed by the computing device and that show at least a portion of the geographic area associated with the topic of the search query.

12. The method of claim 1, wherein the corresponding group of events represented by the respective set of map personalization makers for the first of the candidate temporal layers are a collection of events specified by a particular user over a period of time.

13. The method of claim 1, wherein particular ones of the plurality of candidate temporal layers were created and shared by different, independent users.

14. The method of claim 1, wherein the first of the candidate temporal layers corresponds to a group of events that occurred before submission of the search query.

15. The method of claim 1, wherein selecting the first of the candidate temporal layers based on the topic of the search query comprises comparing a timespan associated with the topic of the search query with corresponding timespans associated with one or more candidate temporal layers of the plurality of candidate temporal layers.

16. The method of claim 1, wherein selecting the first of the candidate temporal layers based on the topic of the search query comprises comparing the geographic area associated with the topic of the search query with corresponding geographic areas associated with one or more candidate temporal layers of the plurality of candidate temporal layers.

17. The method of claim 1, wherein:

the user profile for the first user and the user profile for the other users are each represented by a vector having a plurality of vector components, each vector component representing a respective user characteristic; and comparing the user profile for the first user to the user profiles for the other users comprises determining measures of distance between the vector representing the user profile for the first user and the vectors representing the user profiles for the other users.

\* \* \* \* \*